Dec. 18, 1928.

J. GIESECKE ET AL 1,695,649

APPARATUS FOR FEEDING PAPER SHEETS

Filed Sept. 24, 1927

Inventors:
Julius Giesecke
Herm. Giesecke

Witnesses

Patented Dec. 18, 1928.

1,695,649

UNITED STATES PATENT OFFICE.

JULIUS GIESECKE AND HERMANN GIESECKE, OF LEIPZIG-LEUTZSCH, GERMANY.

APPARATUS FOR FEEDING PAPER SHEETS.

Application filed September 24, 1927, Serial No. 221,835, and in Germany November 5, 1926.

This invention relates to an improvement in or modification of the apparatus for feeding paper sheets as described in our prior U. S. Patent, No. 1,649,401, and comprising a plurality of conveyor ribbons. In said apparatus, the sheets are placed in straightened position on a table plate underneath the upper part of the lowermost conveyor ribbon.

The present invention provides improved means for facilitating said work and preventing a disturbance in the supply of sheets. To this end, a detachable weakly curved rake is employed, on which the straightened sheets are placed and which is guided during its use at its lower end on the conveyor ribbon and the table plate respectively and at its upper end on longitudinal rails by means of guide-rollers thereon. Said rake forms an inclined plane, from which the sheets can easily slip off and be taken up by the conveyor ribbon. During the advance of the sheet-loaded rake, other similar rakes with fresh sheets thereon can be applied, so that an uninterrupted working of the apparatus is ensured.

The same arrangement of sheet-feeding rake can be used on the uppermost conveyor ribbon, if desired.

Figure 1:
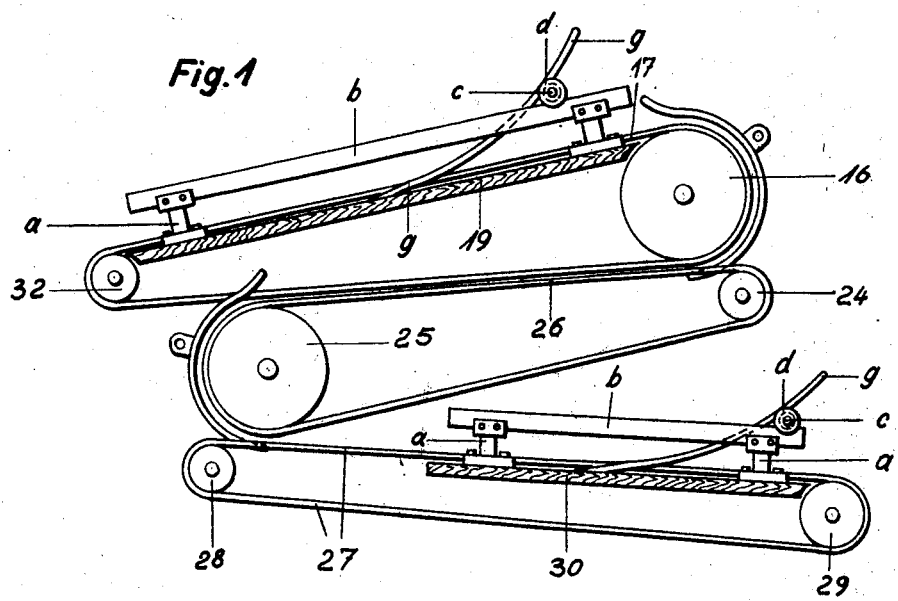
Figure 2:
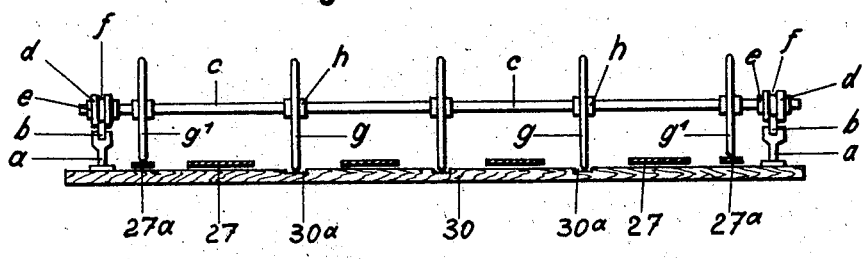
Figure 3:
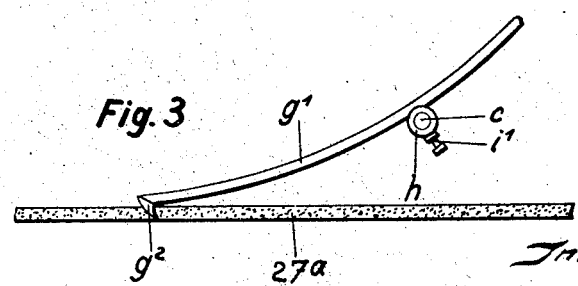

The accompanying drawing illustrates the improvement: Fig. 1 is a side view thereof, as applied to the lowermost as well as to the uppermost conveyor ribbon; Fig. 2 is an end view thereof, and Fig. 3 shows a detail thereof in a side view on a larger scale.

Beyond the conveyor ribbon 27, which is guided over rollers 28, 29, the table plate 30, on which bears the upper part of said ribbon, carries on each side thereof two fixed brackets $a$ connected by a rail $b$ that is directed parallel to said ribbons. The rake to be put on said rails consists of a spindle $c$ with loose guide-rollers $d$ mounted at its ends and prevented from axial displacement thereon by means of a set-ring $e$ on each side thereof, said rollers being grooved and engaging with its groove $f$ freely over the rails $b$ so that the spindle cannot be displaced in lateral directions. The spindle $c$ carries a plurality of weakly curved rake members $g$ arranged thereon at equal distances from each other and adjustably fixed thereto by means of their integral lugs $h$ and set-screws $i$ with counter-nuts $i^1$.

The lower end of said rake bears upon the table plate and engages in groove $30^a$ therein, preferably at the places intermediate the conveyor ribbon parts 27, while the spindle $c$ bears with its guide-rollers $d$ on the lateral rails $b$ and can be moved along the same. The front ends of the two outermost rake members $g^1$ bear upon the two outermost narrow conveyor ribbon parts $27^a$ and are for their intimate contact with the latter fitted with pointed counter-hooks $g^2$ engaging in the fabric of the conveyor ribbon without damaging the same.

If it is desired to supply sheets directly to the uppermost conveyor ribbon 17, which is guided over the rolls 16, 32 and provided with a table plate 19 underneath its upper part, the same arrangement of sheet-feeding rake can be used thereon.

Normally, however, the sheets are fed from the lowermost conveyor 27 to the uppermost one 17 by means of an intermediary conveyor 26 guided over rolls 24, 25.

What we claim, is:—

1. In an apparatus for feeding paper sheets, the combination with a conveyor ribbon and a table plate underneath its upper part, of fixed rails located on both sides of said table plate beyond said conveyor ribbon and directed parallel to the latter, a detachable weakly curved sheet-reception rake forming an inclined plane and during its use guided at its lower end on the conveyor ribbon and on the table plate respectively and at its upper end on said rails.

2. In an apparatus as specified in claim 1, grooved guide-rollers on said rake adapted to freely engage over said rails.

3. An apparatus as specified in claim 1, in which said table plate is provided with grooves for engagement with the lower end of said rake.

4. In an apparatus as specified in claim 1, pointed counterhooks at the lower end of said rake for engagement with said conveyor ribbon.

5. An apparatus as specified in claim 1, in which said rake consists of a plurality of adjustable rake members.

In testimony whereof we have hereunto set our hands.

JULIUS GIESECKE.
HERMANN GIESECKE.